United States Patent
Yamamoto et al.

[11] Patent Number: 5,476,152
[45] Date of Patent: Dec. 19, 1995

[54] STEERING CONTROL SYSTEM BY PILOT PRESSURE

[75] Inventors: Yukyu Yamamoto; Masazumi Oikawa, both of Komatsu, Japan

[73] Assignee: Kabushiki Kaisha Komatsu Seisakusho, Tokyo, Japan

[21] Appl. No.: 94,197

[22] PCT Filed: Jan. 17, 1992

[86] PCT No.: PCT/JP92/00033

§ 371 Date: Sep. 1, 1993

§ 102(e) Date: Sep. 1, 1993

[87] PCT Pub. No.: WO92/13746

PCT Pub. Date: Aug. 20, 1992

[30] Foreign Application Priority Data

Feb. 7, 1991 [JP] Japan ................................ 3-011191

[51] Int. Cl.$^6$ .................................................. B60K 26/00
[52] U.S. Cl. .................. 180/333; 74/471 XY; 192/12 C; 192/13 R; 192/17 A
[58] Field of Search ...................... 180/333, 332, 180/6.3, 6.4, 6.24; 137/595, 636.2; 74/471 XY; 192/13 R, 17 A, 12 C

[56] References Cited

U.S. PATENT DOCUMENTS

| | | | |
|---|---|---|---|
| 3,677,632 | 7/1972 | Chatterjea | 180/6.48 |
| 4,078,628 | 3/1978 | Reichenberger | 180/333 |
| 4,175,649 | 11/1979 | Monks | 192/12 C |
| 4,404,991 | 9/1983 | Cullen | 74/471 XY |
| 4,559,844 | 12/1985 | Mor | 180/333 |
| 5,375,686 | 12/1994 | Yamamoto | 192/12 C |

FOREIGN PATENT DOCUMENTS

| | | | |
|---|---|---|---|
| 2109140 | 8/1972 | Germany . | |
| 53-4289 | 2/1978 | Japan . | |
| 9213746 | 8/1992 | WIPO | 180/333 |

*Primary Examiner*—Eric D. Culbreth
*Attorney, Agent, or Firm*—Richards, Medlock & Andrews

[57] ABSTRACT

A steering control system provides a pilot pressure capable of ensuring excellent responsiveness and light operation force and constant shifting strokes of the control lever even in case of wear of the brake and the clutch. The control lever (1) for use in rightward and leftward steering is directly coupled to the pilot pressure control valve (2) and the pilot pressure control valve (2) is coupled to the clutch piston (4) for ON/OFF operation of the clutch (3) and to the brake cylinder (6) for ON/OFF operation of the brake (5) with piping (10,17). When the control lever (1) is shifted to the right or the left, the pilot pressure control valve (2) at the operation side is actuated to set the associated clutch to OFF and then the associated brake to ON.

8 Claims, 2 Drawing Sheets

5,476,152

STEERING CONTROL SYSTEM BY PILOT PRESSURE

FIELD OF THE INVENTION

The present invention relates to a steering control system for controlling steering operations such as forward, rearward, rightward and leftward movements of a construction equipment, such as a bulldozer, by a single control lever and, more particularly, a steering control system for controlling operations of a rightward/leftward steering clutch and a brake by hydraulic pilot pressure.

BACKGROUND OF THE INVENTION

This kind of control has conventionally employed a steering control system capable of controlling forward, rearward, rightward and leftward operations, particularly to be controlled by a single control lever by only a wrist work of the left hand with the left elbow being kept on a left side arm rest. In this case, a construction vehicle moves forwardly when the control lever is shifted from the neutral position to the forward position and moves rearwardly when the lever is shifted to the rearward position, and is steered to the left when the lever is shifted to the left and to the right when the lever is shifted to the right. Though there is no problem in control operations for forward and rearward movement, a mechanical linkage type steering control system comprising a plurality of control levers and rods in combination as shown in FIG. 3 has been employed for transmitting operating forces of these control levers and rods to actuate the clutch and the brake. FIG. 3 shows an example of the steering control system provided with two exclusively used control levers rather than with a single control lever. In this case, a rod type control lever 21 is connected to one end of a lever 23 having a pivotal point 22 and one end of a rod 24 is connected to the other end of the lever 23. The other end of rod 24 is coupled to a brake lever 25 and, when the brake lever 25 is actuated around the pivotal point 26 as a center, a brake 28 is ON and OFF-operated through a lever 27. A loose spring 29 is coupled to this brake lever 25 and the other end of this loose spring 29 is coupled to a steering control clutch valve 31 through a lever 30. When this steering control clutch valve 31 is actuated, a hydraulic pressure is applied to a clutch piston 32 through a piping 33 and the clutch 34 is disengaged. In the drawing, 35 and 36 denote gears and 37 denotes a spring.

However, this mechanical linkage type steering control system is disadvantageous in that the construction is complicated, transmission efficiency is low, operation strokes of control means are long and operating forces required are heavy. This type of steering control system is accompanied by the problem that, when the brake is worn out, the operation strokes vary and a force for tightening the brake band does not respond to control operation.

SUMMARY OF THE INVENTION

An object of the present invention is to provide a steering control system by pilot pressure and eliminate disadvantages of the prior art.

The present invention, therefore, specifies to couple the lever to a pilot pressure control valve during rightward and leftward steering and connect this pilot pressure control valve to the clutch piston for ON and OFF-operating the clutch and to the brake cylinder for ON and OFF-operating the brake with a piping, respectively. This pilot pressure control valve has the positions for the clutch system and the brake system at the left side and also the positions for the clutch system and the brake system at the right side, whereby the positions for the clutch systems at the right and left sides and the positions for the brake systems at the right and left sides are arranged in alternate crossing layout, and these four positions in the circuitry are independent.

When the control lever is shifted to right or left during rightward and leftward steering operation, the pilot pressure control valve at the side where the control lever is operated is actuated to set the associated clutch to OFF by the pilot pressure of the clutch system position and subsequently the associated brake to ON by the pilot pressure of the brake system position.

BEST MODE FOR CARRYING OUT THE INVENTION

Figure 1:
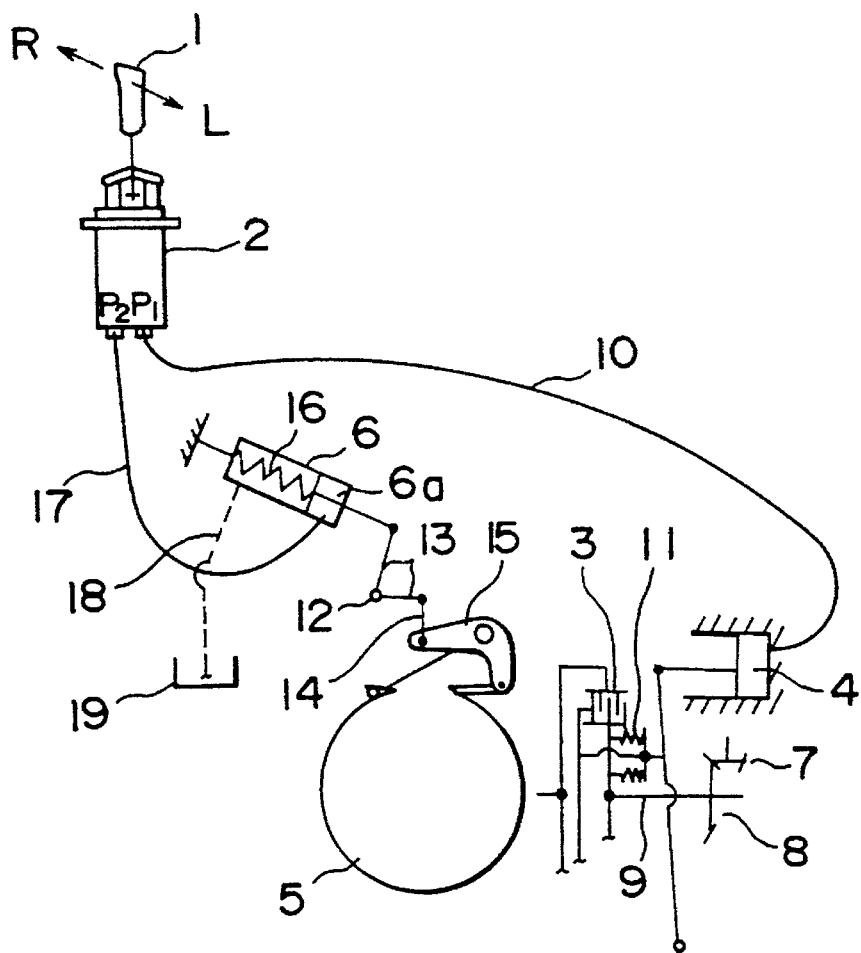
FIG. 1 is an illustration of a steering control system by pilot pressure according to the present invention.
Figure 2:
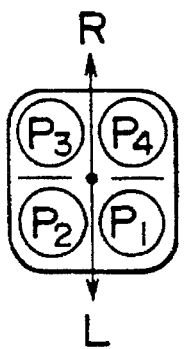
FIG. 2 is an illustration showing operating positions of the control lever shown in FIG. 1.
Figure 3:
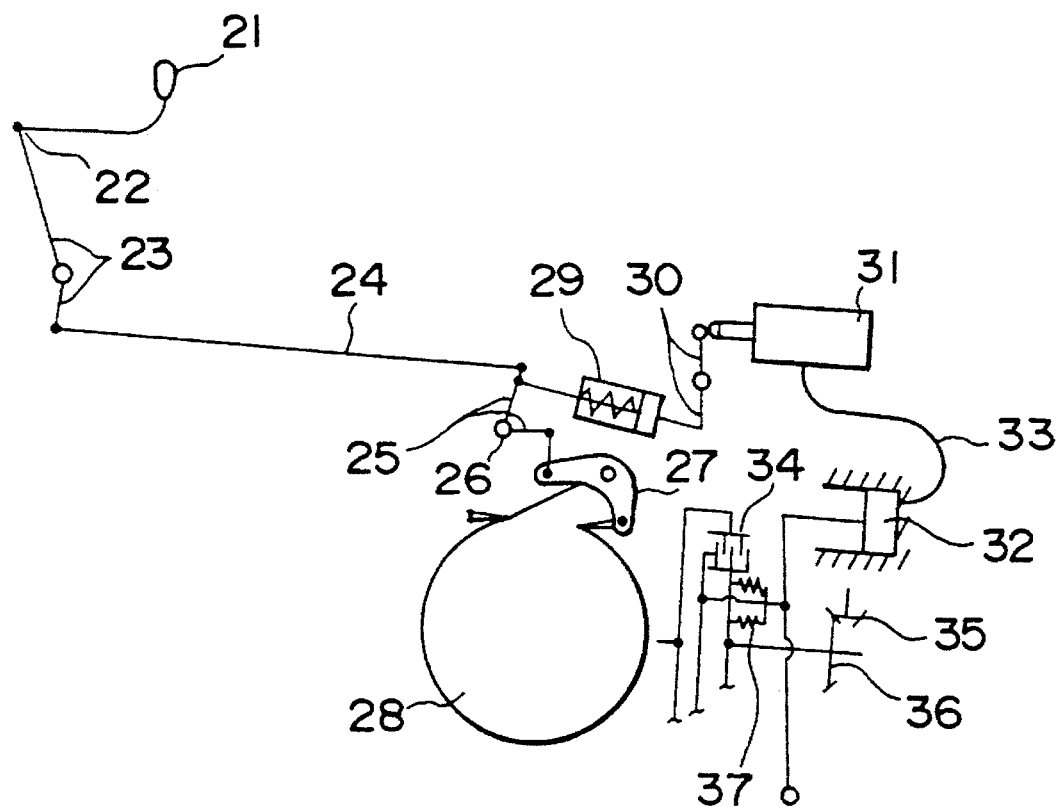
FIG. 3 is an illustration of a conventional mechanical steering control system.

A steering control system by pilot pressure in accordance with the present invention is described in detail by referring to FIGS. 1 and 2.

The present invention comprises a control system for controlling forward and rearward movement and rightward and leftward movement of the vehicle respectively by forward and rearward shifting and rightward and leftward shifting of a single control lever for moving the vehicle wherein a lever 1 for rightward and leftward steering is directly connected to the pilot pressure control valve 2, and the pilot pressure control valve 2 is by a first piping 10 coupled to a clutch piston 4 for ON and OFF-operating a clutch 3 by second piping 17 and to a brake cylinder 6 for ON and OFF-operating a brake 5.

When this single control lever 1 is shifted to the forward or rearward position, it is connected to one of the levers of the transmission, not shown, for forward or rearward movement to make the vehicle travel forwardly or rearwardly and, when the control lever is shifted to the right or left position, it is connected to a steering system described later to make the vehicle travel in a rightward or leftward direction. When the pilot pressure control valve 2 is directly coupled to the lever 1 for rightward and leftward steering and the control lever 1 is shifted to the right and the left, the pilot pressure control valve 2 is directly actuated. The pilot pressure control valve 2 is known in its construction and is connected to a pilot pump and a tank, not shown, with a circuit. Though the pilot pressure control valve 2 does not operate at the neutral position, when the control lever 1 is shifted, the circuit and the pump at the operation side are connected to actuate the pilot pressure.

This pilot pressure control valve 2, as shown in FIG. 2, has position P1 for the clutch system and position P2 for the brake system at the left side (L), and position P3 for the clutch system and position P4 for the brake system at the right side (R). As shown in FIG. 2, the left and right clutch positions P1 and P3 and the left and right brake positions P2 and P4 are arranged around the neutral position of the lever 1 so that the left and right clutch positions P1 and P3 alternate with the left and right brake positions P2 and P4, with the left and right clutch positions P1 and P3 being diagonally across from each other with respect to the neutral position of the lever 1 while the left and right brake positions P2 and P4 are diagonally across from each other with respect to the neutral position of the lever 1. Thus, positions. P1 and P3 and positions P2 and P4 are alternately crossed. The circuits of these four positions are independent. When the control lever 1 is shifted to the left, the position P1 operates first and the position P2 operates subsequently and, when the control lever 1 is shifted to the right, the position P3 operates first and the position P4 operates subsequently.

In the above described steering system, the driving force of the output axle gear 7 is transmitted to the gear 8 which orthogonally intersects the output axle gear 7, and the steering system comprises the clutch 3 and the brake 5 which are respectively provided on axles 9 (only the left side is shown with the right side omitted) at both sides of this gear 8. ON/OFF operation of the clutch 3 is hydraulically performed by a pilot pressure applied to the clutch piston 4, which is coupled to the position P1 or P3 of the pilot pressure control valve 2 with piping 10. In the drawing, 11 is a spring which keeps the clutch 3 always engaged.

On the other hand, the brake is coupled to the brake cylinder 6 via the lever 15, the brake lever 13 having the pivotal point 12, and the rod 14. When a hydraulic pressure is applied to the brake cylinder 6, the piston 6a in the brake cylinder 6 acts against the spring 16 to actuate the brake lever 13 to pivot the lever 15 in the direction wherein the brake band is tightened, whereby the brake is activated. The brake cylinder 6 is coupled to the position P2 or P4 of the pilot pressure control valve 2 with piping 17. In the drawing, 18 is a circuit communicated to the tank 19.

The following describes the operation of the steering control system. When the control lever 1 is shifted to the left (L) to change the direction of the travelling vehicle to the leftward direction, the pilot pressure control valve 2 operates to supply a pilot pressure via piping 10 to the clutch piston 4 to apply a hydraulic pressure to the clutch piston 4. Then the clutch piston 4 is pushed against the force of the spring 11 to make the clutch 3 OFF. When the pilot pressure is sent by piping 17 from the position P2 to the brake cylinder 6, the piston 6a in the brake cylinder is pushed against the spring 16 so that the brake lever 13 is pivoted to actuate the lever 15 in the direction to tighten the brake band, whereby the brake 5 is set to ON. Accordingly, the vehicle changes the direction of travel from straight advancing to leftward travel. When the control lever 1 is returned to the neutral position, the pilot pressure control valve 2 is reset to the neutral position and consequently the pilot pressure of piping 10 and 17 is eliminated. Accordingly, the clutch piston 4 is set to OFF, the clutch 3 is set to ON by spring 11, the brake piston 6a is simultaneously pushed back by spring 16, the brake lever 13 is pivoted in the reverse direction, the brake band is released by the lever 15 and the brake 5 is set to OFF.

For similarly changing the direction of the travelling vehicle to the rightward direction, the pilot pressure control valve 2 is actuated by shifting the control lever 1 to the right (R) to supply a pilot pressure from position P3 via piping 10 to the clutch piston 4 and set the clutch 3 to OFF. When a pilot pressure from position P4 is supplied via piping 17 to the brake cylinder 6, the piston 6a in the brake cylinder 6 is pushed against spring 16, so that the brake lever 13 is pivoted to actuate the lever 15 in the direction to tighten the brake band and the brake 5 is set to ON. Thus the vehicle changes the direction of travel from straight advancing to rightward travel. According to the present invention, as described above, the control lever 1 for use in rightward and leftward travel is directly connected to the pilot pressure control valve 2 and the pilot pressure control valve 2 is coupled to the clutch piston 4 for ON/OFF operation of the clutch 3 and to the brake cylinder 6 for ON/OFF operation of the brake 5, respectively, and therefore more free arrangement of the piping is obtained as compared with the conventional mechanical linkage, responsiveness is improved owing to the hydraulic system, and operating force of control means is relieved. In addition, the operation stroke need not be adjusted for wear of the brake and the clutch differing from the linkage type and the shifting strokes of the control lever can be fixed.

INDUSTRIAL APPLICABILITY

The present invention provides a useful steering control system capable of ensuring excellent responsiveness and light operation force owing to the hydraulic system and constant shifting strokes of the control lever even in case of wear of the brake and the clutch.

What is claimed is:

1. A steering control system for controlling steering of a vehicle during forward or rearward travelling of said vehicle, said control system utilizing pilot pressure for controlling forward and rearward shifting operations and rightward and leftward steering operations in response to rightward and leftward shifting of a single control lever, said steering control system being characterized in that said single control lever is directly coupled to a pilot pressure control valve, said pilot pressure control valve being coupled by first piping to a clutch piston for ON/OFF operation of a clutch and by second piping to a brake cylinder for ON/OFF operation of a brake.

2. A steering control system in accordance with claim 1, wherein said pilot pressure control valve has a first position for a clutch system at a left side of said vehicle, a second position for a brake system at the left side of said vehicle, a third position for a clutch system at a right side of said vehicle, and a fourth position for a brake system at the right side of said vehicle, wherein each of said first, second, third, and fourth positions of said pilot pressure control valve has an independent hydraulic circuit, said first and third positions of said pilot pressure control valve and said second and fourth positions of said pilot pressure control valve being arranged around a neutral position of said single control lever so that said first and second positions of said pilot pressure control valve alternate with said second and fourth positions of said pilot pressure control valve, with said fourth position of said pilot pressure control valve being diagonally across from said second position of said pilot pressure control valve with respect to said neutral position of said single control lever, and with said third position of said pilot pressure control valve being diagonally across from said first position of said pilot pressure control valve with respect to said neutral position of said single control lever.

3. A steering control system for a traveling vehicle, said steering control system comprising:

a single control lever for controlling forward and rearward steering operations of the traveling vehicle by forward and rearward shifting of said single control lever and for controlling rightward and leftward steering of the traveling vehicle by rightward and leftward shifting of said single control lever;

a left clutch system for said traveling vehicle;

a left brake system for said traveling vehicle;

a right clutch system for said traveling vehicle;

a right brake system for said traveling vehicle;

a pilot pressure valve, said pilot pressure valve having first, second, third and fourth independent operative positions, said first operative position being connected to said left clutch system, said second operative position being connected to said left brake system, said third operative position being connected to said right clutch system, said fourth operative position being connected to said right brake system; and said single control lever being directly coupled to said pilot pressure control valve to actuate said pilot pressure control valve to one of its operative positions.

4. A steering control system in accordance with claim 3, wherein said first and third operative positions of said pilot pressure valve for the clutch systems at right and left sides alternate with said second and fourth operative positions of said pilot pressure valve for the brake systems at right and left sides in the arrangement of said first, second, third and fourth operative positions around a neutral position of said single control lever, with said first and third operative positions of said pilot pressure valve being diagonally across from one another in their arrangement with respect to said neutral position of said single control lever, and with said second and fourth operative positions of said pilot pressure valve being diagonally across from one another in their arrangement with respect to said neutral position of said single control lever.

5. A steering control system in accordance with claim 3, wherein said single control lever actuates said first operative position of said pilot pressure valve before actuating said second operative position of said pilot pressure valve, and wherein said single control lever actuates said third operative position of said pilot pressure valve before actuating said fourth operative position of said pilot pressure valve.

6. A steering control system in accordance with claim 3, wherein said left clutch system includes a left clutch piston for operation of a left clutch of said traveling vehicle;

wherein said left brake system includes a left brake cylinder for operation of a left brake of said traveling vehicle;

wherein said right clutch system includes a right clutch piston for operation of a right clutch of said traveling vehicle;

wherein said right brake system includes a right brake cylinder for operation of a right brake of said traveling vehicle; and wherein said first operative position is connected to said left clutch piston, said second operative position is connected to said left brake cylinder, said third operative position is connected to said right clutch piston, and said fourth operative position is connected to said right brake cylinder.

7. A steering control system in accordance with claim 6, wherein said first and third operative positions of said pilot pressure valve for the clutch systems at right and left sides alternate, in their arrangement with respect to a neutral position of said single control lever, with said second and fourth operative positions of said pilot pressure valve for the brake systems at right and left sides, wherein said first and third operative positions of said pilot pressure valve are diagonally across from one another in their arrangement with respect to said neutral position of said single control lever, and wherein said second and fourth operative positions of said pilot pressure valve are diagonally across from one another in their arrangement with respect to said neutral position of said single control lever.

8. A steering control system in accordance with claim 7, wherein said single control lever actuates said first operative position of said pilot pressure valve before actuating said second operative position of said pilot pressure valve, and wherein said single control lever actuates said third operative position of said pilot pressure valve before actuating said fourth operative position of said pilot pressure valve.

* * * * *